(12) United States Patent
Corbett et al.

(10) Patent No.: US 9,340,086 B2
(45) Date of Patent: May 17, 2016

(54) THRUST BEARING AND SUSPENSION FOR VEHICLE

(75) Inventors: Richard Corbett, Fondettes (FR); Jerôme Dubus, La Riche (FR); Bruno Montboeuf, Cerelles (FR); Samuel Viault, Saint Antoine du Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 1145 days.

(21) Appl. No.: 13/384,858

(22) PCT Filed: Jul. 19, 2010

(86) PCT No.: PCT/EP2010/060398
§ 371 (c)(1),
(2), (4) Date: Jun. 26, 2012

(87) PCT Pub. No.: WO2011/012484
PCT Pub. Date: Feb. 3, 2011

(65) Prior Publication Data
US 2012/0257849 A1    Oct. 11, 2012

(30) Foreign Application Priority Data

Jul. 29, 2009   (FR) ...................................... 09 55311

(51) Int. Cl.
*F16C 33/76*    (2006.01)
*F16C 19/10*    (2006.01)
(Continued)

(52) U.S. Cl.
CPC .............. *B60G 15/067* (2013.01); *F16C 19/10* (2013.01); *F16C 33/60* (2013.01); *F16C 33/761* (2013.01); *B60G 2204/418* (2013.01)

(58) Field of Classification Search
CPC ........... B60G 15/067; B60G 2204/124; B60G 2204/127; B60B 2204/418; F16C 33/761; F16C 33/60; F16C 19/10; F16C 35/04; F16C 33/7866; F16C 2361/53; F16C 19/16; F16F 2326/05
USPC .......... 384/607, 609, 615, 611, 617; 267/220, 267/221

See application file for complete search history.

(56) References Cited

U.S. PATENT DOCUMENTS 4,805,886 A * 2/1989 Hassan .......................... 267/220
5,467,971 A * 11/1995 Hurtubise et al. ............ 267/220
(Continued)

FOREIGN PATENT DOCUMENTS

EP    1555144 A2 *  7/2005
EP    2505392 A1 * 10/2012
(Continued)

*Primary Examiner* — Marcus Charles
(74) *Attorney, Agent, or Firm* — Bryan Peckjian; SKF USA Inc. Patent Dept.

(57) ABSTRACT

The suspension thrust bearing device for a motor vehicle comprises a rolling bearing forming an axial thrust bearing and provided with an upper ring, with a lower ring and with at least one row of rolling elements arranged between the rings, a bearing cap in contact with the upper ring, and a support cap in contact with the lower ring and forming a bearing means for a suspension spring. The support cap comprises a body of rigid material and seals of flexible material fixed to the body and comprising dynamic sealing lips in contact with the bearing cap or one of the rings of the rolling bearing and delimiting radially a sealed space containing at least the rolling elements of the rolling bearing. The support cap further comprises an annular ring to which the lower ends of the seals are connected and forming a bearing surface for the suspension spring.

14 Claims, 3 Drawing Sheets

(51) Int. Cl.
  *F16C 19/16*   (2006.01)
  *B60G 15/06*   (2006.01)
  *F16C 33/60*   (2006.01)

(56) References Cited

U.S. PATENT DOCUMENTS

| | | | |
|---|---|---|---|
| 5,618,116 A | 4/1997 | Ishikawa | |
| 6,267,512 B1 * | 7/2001 | Beghini et al. | 384/607 |
| 6,550,755 B2 * | 4/2003 | Ehrhardt et al. | 267/286 |
| 6,558,043 B2 * | 5/2003 | Beghini et al. | 384/615 |
| 6,814,496 B2 * | 11/2004 | Beghini et al. | 384/617 |
| 6,948,728 B2 * | 9/2005 | Pflugner et al. | 384/611 |
| 7,077,248 B2 * | 7/2006 | Handke et al. | 188/321.11 |
| 7,837,016 B2 * | 11/2010 | Chamousset et al. | 188/321.11 |
| 2002/0009250 A1 | 1/2002 | Schwarzbich | |
| 2005/0247531 A1 * | 11/2005 | Oota | 188/322.19 |
| 2008/0048370 A1 * | 2/2008 | Corlet et al. | 267/220 |
| 2011/0133379 A1 | 6/2011 | Viault | |
| 2011/0291337 A1 * | 12/2011 | Viault et al. | 384/609 |

FOREIGN PATENT DOCUMENTS

| | | | | |
|---|---|---|---|---|
| FR | 2857906 A1 * | 1/2005 | | B60G 15/06 |
| FR | 2865008 A1 | 7/2005 | | |
| FR | 2909929 A1 * | 6/2008 | | |
| FR | 2915929 A1 | 11/2008 | | |
| FR | 2918138 A1 | 1/2009 | | |
| FR | 2934656 A1 | 2/2010 | | |
| FR | 2937587 A1 * | 4/2010 | | B60G 15/06 |
| WO | WO2009106469 A1 | 9/2009 | | |
| WO | WO 2010012766 A1 * | 2/2010 | | B60G 15/06 |
| WO | WO 2011006881 A1 * | 1/2011 | | |

* cited by examiner

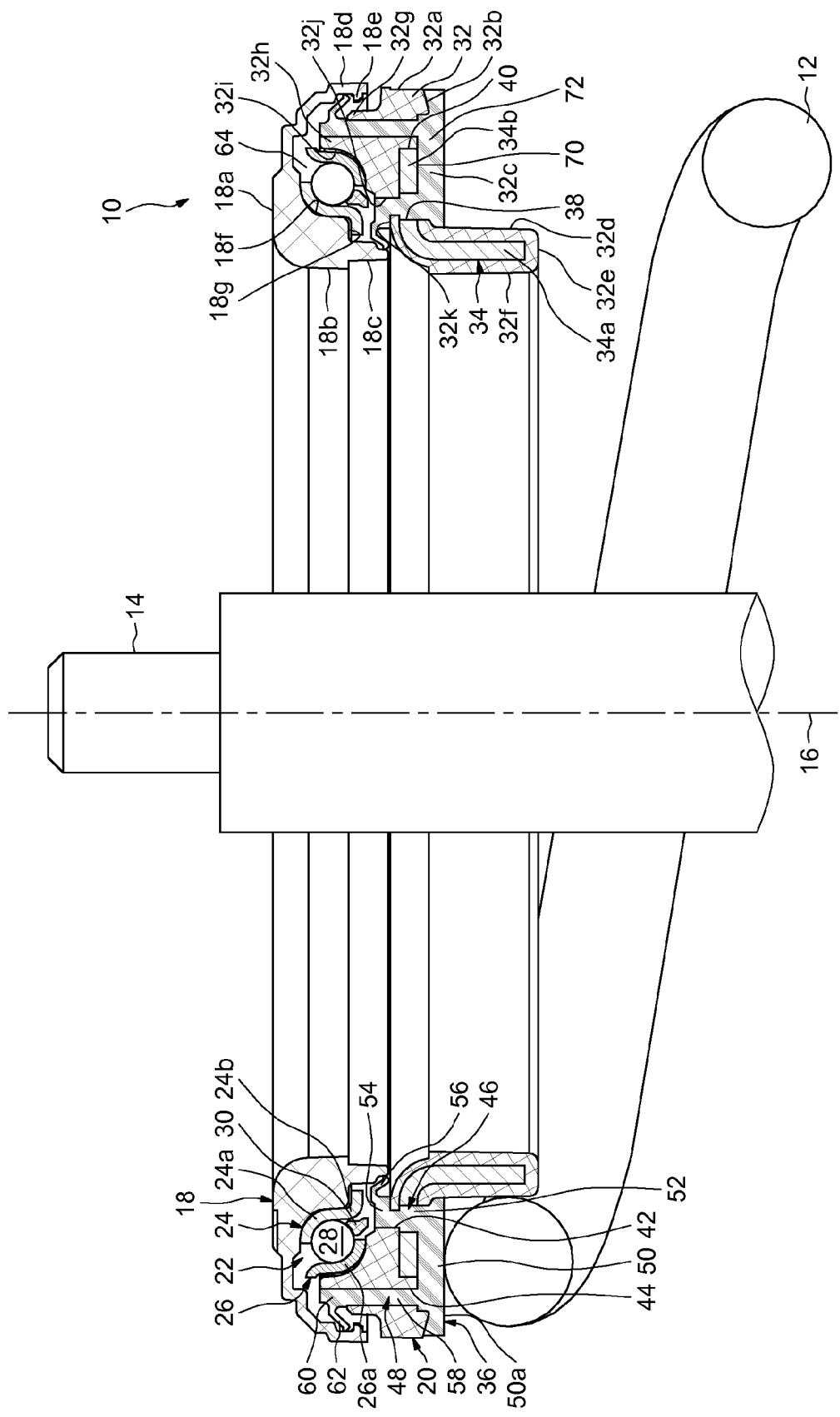

THRUST BEARING AND SUSPENSION FOR VEHICLE

CROSS-REFERENCE

This application is the US national stage of International Application No. PCT/EP2010/060398 filed on Jul. 19, 2010, which claims priority to French Application No. FR 0955311 filed Jul. 29, 2009.

FIELD OF INVENTION

The present invention relates to the field of suspension thrust bearing devices used in particular in motor vehicles in the suspension struts of the steered wheels.

BACKGROUND OF THE INVENTION

The invention relates more particularly to a suspension thrust bearing device comprising an upper ring and a lower ring between which is arranged at least one row of rolling elements, for example, balls or rollers. The upper and lower rings are generally mounted in contact with lower and upper bearing or support parts, such as cups or caps. The upper and lower caps form a housing for the rings of the rolling bearing and provide the interface between the rings and the surrounding elements.

The suspension thrust bearing device is arranged in the upper part of the suspension strut between the body shell of the vehicle and a suspension spring. The spring is installed around a shock absorber piston rod of which the end is connected to the body shell of the vehicle via an elastic block which filters out vibrations. The suspension spring bears axially, directly or indirectly, on the lower bearing cap. The upper bearing cap for its part is fixed with respect to the body shell of the vehicle.

Such a suspension thrust bearing device makes it possible to transmit axial forces between the suspension spring and the body shell of the vehicle while allowing a rotational movement between the lower bearing cap and the filtering elastic block resulting from a turning of the steered wheels of the vehicle and/or from the compression of the suspension spring.

The patent application FR-A1-2 915 929 discloses a suspension thrust bearing provided with a lower support cap and with a rolling bearing mounted in contact against the latter. The support cap comprises a body made of rigid synthetic material onto which is overmoulded a filtration element forming a bearing surface for the suspension spring in order to absorb in part the vibrations generated by the latter. The filtration element also comprises a sealing lip which comes into frictional contact with an outer skirt of the upper bearing cap.

The suspension thrust bearing of this document does not make it possible to provide a good sealing of the rolling bearing. Specifically, on the inner side of the thrust bearing, a single narrow passage is provided between the upper bearing cap and the lower support cap to provide the sealing of the rolling bearing.

Therefore, under certain conditions, for example when the vehicle is driving along a flooded road or alternatively when the vehicle is being cleaned with a high-pressure jet of water, there may be some infiltration of water or other pollutant particles into the rolling bearing with detrimental effects on the life of the suspension thrust bearing.

The present invention aims to overcome this disadvantage.

SUMMARY OF THE INVENTION

More particularly, the present invention aims to provide a robust suspension thrust bearing device capable of withstanding the forces exerted by the suspension spring and of absorbing some of the vibrations emitted by the spring, while reducing any infiltration of water or other pollutant particles.

The present invention also aims to provide a suspension thrust bearing device which is particularly reliable over time and is of simple and economic design.

In one embodiment, the suspension thrust bearing device for a motor vehicle comprises a rolling bearing forming an axial thrust bearing and provided with an upper ring, with a lower ring and with at least one row of rolling elements arranged between the rings, a bearing cap in contact with the upper ring, and a support cap in contact with the lower ring and forming a bearing means for a suspension spring.

The support cap comprises a body of rigid material and seals of flexible material fixed to the body and comprising dynamic sealing lips in frictional contact with the bearing cap or with one of the rings of the rolling bearing and delimiting radially a sealed space containing at least the rolling elements of the rolling bearing. The support cap further comprises an annular ring to which the lower ends of the seals are connected and forming or delimiting a bearing surface for the suspension spring. By "dynamic sealing" is understood a sealing between two parts having a relative movement.

In one embodiment, the seals each comprise a plurality of studs extending axially from the annular ring and connected to the associated sealing lip.

Preferably, the annular ring covers at least a lower radial surface of the support cap that is axially opposed to an upper bearing surface of the cap against which the lower ring of the rolling bearing comes into contact.

The sealing lips and the annular ring may advantageously be produced integrally.

The support cap may comprise a body produced in a rigid material, the sealing lips and the annular ring being produced in a flexible material. The flexible material is advantageously overmoulded onto the rigid material.

In one embodiment, the support cap comprises a reinforcing insert embedded at least in part into the body of the cap. Preferably, at least part of the body of the support cap is situated radially between the flexible material and the reinforcing insert. The reinforcing insert may comprise means capable of allowing the passage of the flexible material through the insert during its overmoulding.

In one embodiment, the body of the support cap is in direct contact with the reinforcing insert. The flexible material may also be in direct contact with the reinforcing insert. Advantageously, the flexible material is overmoulded onto the body of the support cap and onto the reinforcing insert.

The support cap may comprise an external sealing lip in frictional contact with the bearing cap. The bearing cap may also comprise a hook extending radially inwards and cooperating with the external sealing lip for axially retaining the bearing cap relative to the support cap. There is thus available a unitary assembly which can be stored, transported, handled and mounted with a relatively low risk of axial detachment of the elements constituting it by virtue of the cooperation between the sealing lip of the support cap and the hook of the bearing cap.

The support cap may also comprise an internal sealing lip in frictional contact with the bearing cap or the upper ring of the rolling bearing. By "external lip" is understood the lip oriented towards the outside of the device and by "internal lip" is meant the lip extending towards the inside of the device.

In one embodiment, the support cap comprises a body capable of transmitting the axial forces between the suspension spring and the rolling bearing and seals fixed to the body. The seals comprise dynamic sealing lips in frictional contact with the bearing cap or with one of the rings of the rolling bearing and delimiting radially a sealed space containing the rolling elements of the rolling bearing, and an annular ring interconnecting the sealing lips and forming a bearing surface for the suspension spring. The spring may come into direct contact against the annular ring.

The invention also relates to a strut comprising a shock absorber and a suspension thrust bearing device as defined above.

BRIEF DESCRIPTION OF THE DRAWINGS

The present invention will be better understood on studying the detailed description of embodiments taken by way of non-limiting examples and illustrated by the appended drawings, in which:

FIG. 3 is a view in axial section of a suspension thrust bearing device according to a second embodiment of the invention.

DETAILED DESCRIPTION OF THE PREFERRED EMBODIMENTS

Figure 1:
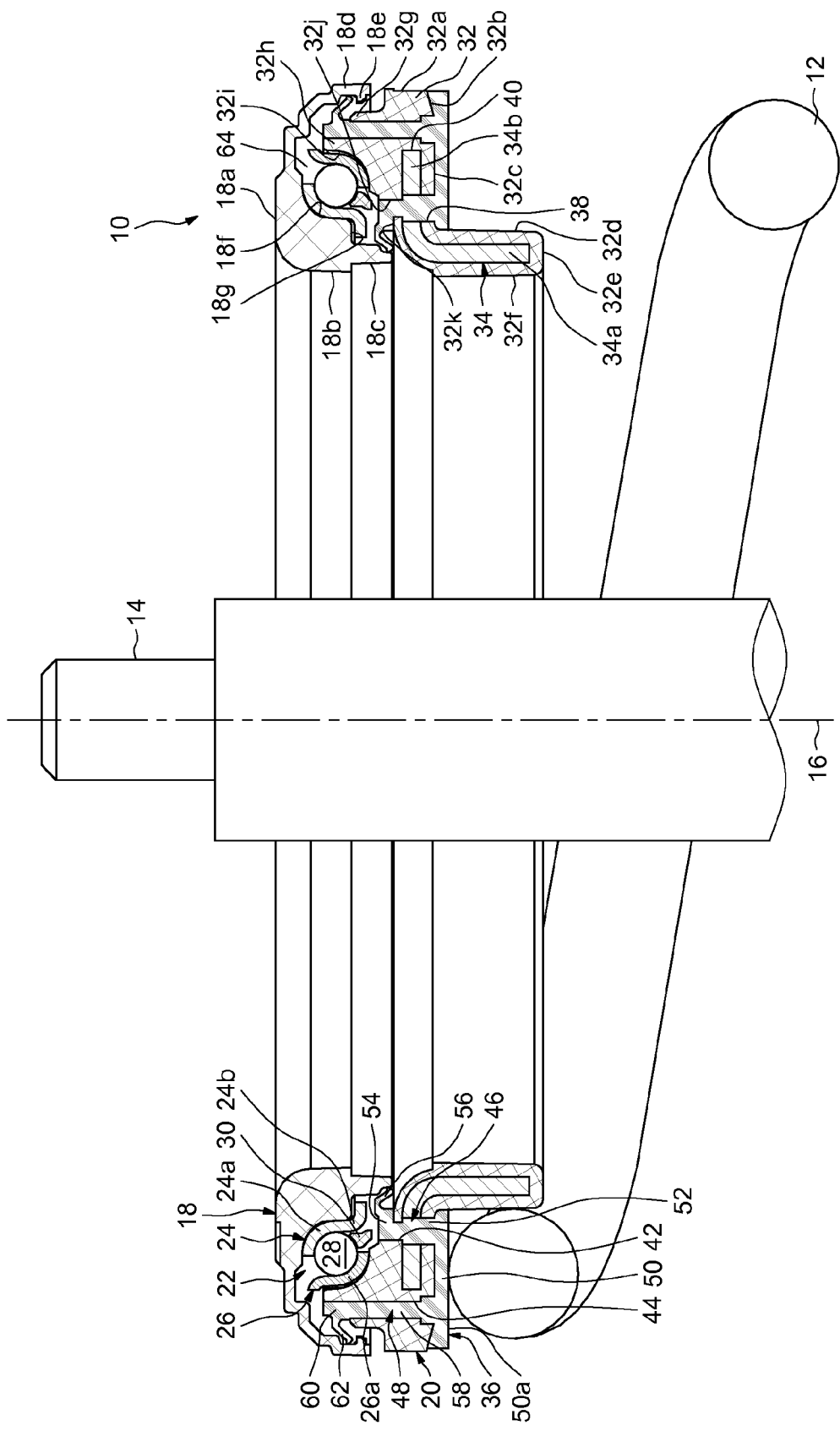
FIG. 1 is a view in axial section of a suspension thrust bearing device according to a first embodiment of the invention.

FIG. 1 depicts a suspension thrust bearing device, denoted by the general reference number 10, designed to be mounted between an element of the chassis of a motor vehicle and a helical-type suspension spring 12. The device 10 is arranged around a shock absorber rod 14, of axis 16 assumed to be vertical, the rod being elongated axially in the form of a cylinder of revolution. The suspension spring 12 is mounted around the shock absorber rod 14.

The device 10, of axis 16, comprises an upper bearing cap 18 designed to come into contact against a filtering elastic block interposed between the device and the chassis of the vehicle, a lower support cap 20 forming a bearing means for the spring 12, and a rolling bearing 22 arranged axially between the caps and forming an axial thrust bearing.

The bearing cap 18 may consist of an integral part produced from plastic, for example polyamide PA 6.6 optionally reinforced with glass fibres. The bearing cap 18 comprises an upper radial surface 18a intended to come into contact with the filtering elastic block, an axial surface 18b extending downwards, from a small-diameter edge of the radial surface 18a, and a thin internal annular axial skirt 18c arranged substantially in the continuation of the axial surface 18b, axially downwards.

The bearing cap 18 also comprises a thin external annular axial skirt 18d of large diameter connecting to the upper radial surface 18a, via a substantially frustoconical portion extending towards the inside an upper edge of the skirt, itself extended to a small-diameter edge towards the inside by a substantially radially portion. A hook 18e directed towards the inside, which may be continuous or discontinuous circumferentially, is formed on the internal edge of the external axial skirt 18d, in the vicinity of its lower end. The hook 18e is directed radially inwards in the direction of the support cap 20.

The rolling bearing 22, of axis 16, comprises an upper ring 24 and a lower ring 26 between which is housed a row of rolling elements 28, here produced in the form of balls. A cage 30 is also provided in order to maintain a uniform circumferential spacing between the rolling elements 28. The rolling elements 28 are arranged between raceways formed by the upper 24 and lower 26 rings. Advantageously, the rings can be obtained from the same sheet metal blank by cutting and stamping, by virtue of the fact that the outside diameter of the upper ring 24 is substantially equal to the inside diameter of the lower ring 26.

The upper ring 24 has a toroidal portion 24a in contact with a complementary surface 18f of the bearing cap 18, the toroidal portion 24a being extended inwardly by a toroidal portion 24b of opposite concavity extending in the vicinity of an annular radial surface 18g and connected to the surface 18f and to the internal axial skirt 18c. The outer surface of the toroidal portion 24a has in cross section a quarter-circle concave internal profile and forms a toric raceway for the rolling elements 28.

The lower ring 26 also comprises a toroidal portion 26a of which the inner surface has in cross section a quarter-circle concave internal profile and forms a toric raceway for the rolling elements 28. The toroidal portion 26a comes into contact against the support cap 20 and is extended outwardly by a short radial portion. The cage 30 is situated radially between the toroidal portion 24b of the upper ring 24 and the toroidal portion 26a of the lower ring 26.

The support cap 20 comprises a body 32 produced in a rigid material, an insert 34 for reinforcing the body, and a flexible material 36 designed both to obtain good protection of the rolling bearing 22 against infiltrations of water or pollutant particles and to absorb in part the vibrations generated by the suspension spring 12, as will be described in more detail in the following.

The body 32 makes it possible to transmit the axial forces between the suspension spring 12 and the rolling bearing 22. The body 32 may, for example be produced of rigid plastic such as a polyamide PA 6.6 optionally filled with glass fibres. The body 32 comprises a cylindrical axial outer surface 32a of small axial dimension from the lower end of which there extends inwardly an annular frustoconical surface 32b which is extended inwardly by a lower radial surface 32c. A small-diameter edge of the radial surface 32c is extended inwardly and downwardly by a rounded surface and then by an axial surface 32d. The axial surface 32d allows the centering of the suspension spring 12. From the lower end of the axial surface 32d there extends inwardly a radial annular surface 32e which is extended from a small-diameter edge axially upwardly by an axial surface 32f forming the bore of the support cap 20.

From the upper end of the axial outer surface 32a, the body 32 additionally comprises first and second axial annular ribs 32g, 32h extending axially in the direction of the bearing cap 18. The upper end of the first large-diameter rib 32g is set back axially downwards with respect to the upper end of the second rib 32h. The rib 32h radially surrounds the lower ring 26 of the rolling bearing 22. The upper end of the rib 32h is extended inwardly by an upper surface 32i in contact with the toroidal portion 26a of the lower ring 26 and of complementary shape to the portion 26a. The toroidal surface 32i is extended inwardly by a frustoconical surface from which there extends an axial surface 32j which is extended, at a radially inward lower end, by an annular radial surface 32k which is connected to the axial surface 32f by a rounded surface. The upper toroidal surface 32*i* is axially opposed to the lower radial surface 32*c* and serves as a bearing seat for the lower ring 26.

The annular reinforcing insert 34 has in cross section a general L shape. It comprises an axial portion 34*a* which is extended, outwardly from an upper end, by a rounded portion from which a radial portion 34*b* extends radially outwards. The reinforcing insert 34 may for example be obtained by cutting and stamping from a sheet metal blank sufficiently thick to guarantee that the support cap 20 has sufficient rigidity. The reinforcing insert 34 is entirely embedded in the body 32. The axial portion 34*a* extends axially between a region situated in the vicinity of the radial annular surface 32*e* as far as a region situated beyond the radial surface 32*c*. The radial portion 34*b* extends radially between a region situated at the toroidal portion 24*a* of the upper ring 24 of the rolling bearing 22 as far as a region situated at the toroidal portion 26*a* of the lower ring 26. The reinforcing insert 34 thus makes it possible to stiffen the support cap 20 and to provide a good transmission to the rolling bearing 22 of the axial and radial forces exerted by the suspension spring 12.

Figure 2:
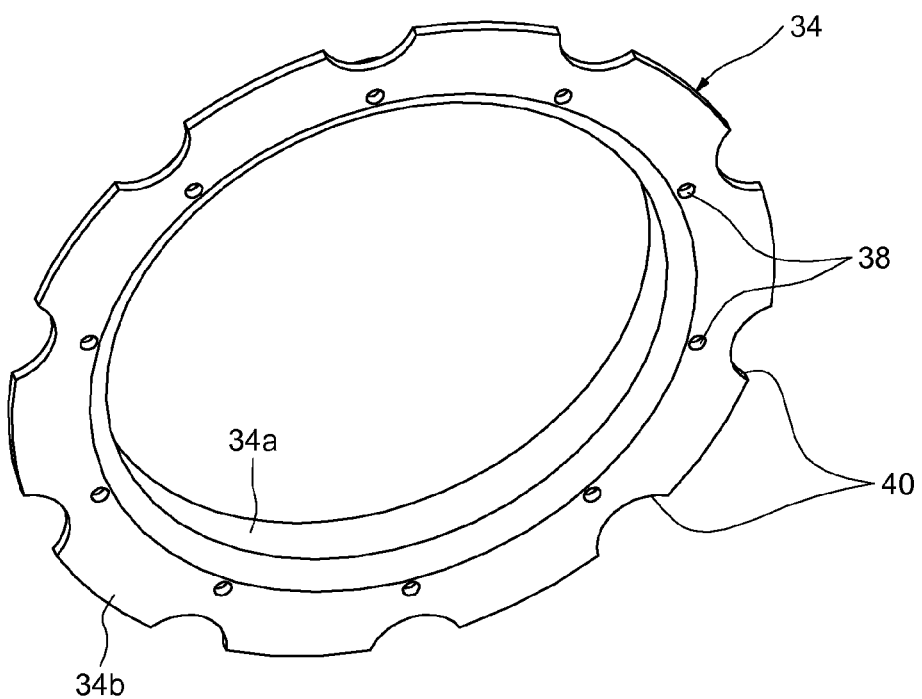
FIG. 2 is a perspective view of a reinforcing insert of the device in FIG. 1.

As illustrated more visibly in FIG. 2, the reinforcing insert 34 comprises a plurality of through-orifices 38 formed on the radial portion 34*b* in the immediate vicinity of its inner edge. The orifices 38, here numbering ten, are distributed uniformly in the circumferential direction. The reinforcing insert 38 additionally comprises a plurality of notches 40 formed from the free edge of the radial portion 34*b*. The notches 40 have a concave general shape and are arranged in such a way that each orifice 38 is aligned radially with a notch 40. Each notch 40 is therefore arranged in the same radial plane as one of the orifices 38.

With reference again to FIG. 1, in the illustrated embodiment, the body 32 of the support cap 20 is overmoulded onto the reinforcing insert 34, these two elements thus being secured to one another. During the overmoulding of the body 32, axial channels 42 and 44 are formed, the first series of channels 42 passing through the orifices 38 of the reinforcing insert 34 and the second series of channels 44 through the notches 40 in such a way that an internal axial channel 42 is situated in the same radial plane as an external channel 44. The axial channels 42 and 44 are formed such that the body 32 can cover the edge delimiting each notch 40 without however covering the bore of the orifices 38.

The flexible material 36 of the support cap 20 is then overmoulded onto the reinforcing insert 34 and the body 32 to form internal 46 and external 48 seals interconnected by an annular ring 50. The flexible material 36 can be for example an elastomer such as a rubber or else polyurethane or thermoplastic elastomer.

The orifices 38 and the notches 40 of the reinforcing insert 34 form passages having a dual function, namely allowing the transfer and the circulation of the flexible material 36 between two opposed surfaces of the insert 34 during manufacture of the support cap 20, and additionally providing an efficient anchoring of the flexible material 36 on the insert. The overmoulding of the body 32 and of the flexible material 36 onto the reinforcing insert 34 is therefore carried out in two successive steps, which can be performed by different techniques, for example by simple overmoulding or else by two-shot injection moulding.

The internal seal 46 comprises a plurality of axial internal studs 52, here numbering ten, formed inside the channels 42 of the body 32. Each internal stud 52 extends axially from the radial surface 32*c* as far as the level of the opposed radial surface 32*k*. Each stud 52 therefore passes axially right through the reinforcing insert 34 via the corresponding orifice 38, while covering the bore of the orifice.

The seal 46 is also provided with an annular claw 54 covering the radial surface 32*k* and connected to all the studs 52, and with a relatively thin annular internal sealing lip 56 projecting inwardly from the claw 54. The sealing lip 56 comes into frictional contact with the outer surface of the internal axial skirt 18*c* of the bearing cap 18. It is curved downwardly.

The external seal 48 also comprises ten axial external studs 58 formed inside the channels 44 of the body 32. Each external stud 58 extends axially from the radial surface 32*c* as far as the level of the upper end of the rib 32*g*. Each stud 58 passes axially right through the reinforcing insert 34 via the corresponding notch 40, while being surrounded radially by material of the body 32. Thus, at the edge delimiting each notch 40 of the reinforcing insert 34, part of the material of the body 32 is situated radially between part of the flexible material 36 and the radial portion 34*b* of the insert.

The seal 48 is additionally provided with an annular claw 60 covering the upper end of the rib 32*g* and the external lateral surface of the rib 32*h*, and connected to all the studs 58. The seal 48 additionally comprises a relatively thin annular external sealing lip 62 emanating from the claw 60 and projecting outwardly. The sealing lip 62 comes into frictional contact against the bore of the external skirt 18*d* of the bearing cap 18. It is curved downwardly and arranged axially above the hook 18*e* of the bearing cap 18.

The lower ends of the studs 52, 58 are connected to the annular ring 50 which extends radially and covers the radial surface 32*c* and the frustoconical surface 32*b* and also the upper end of the axial surface 32*d*. The annular ring 50 is continuous in the circumferential direction and delimits an annular radial bearing surface 50*a* for the upper end turn of the suspension spring 12. The bearing surface 50*a* is continuous in the circumferential direction and is smooth, i.e. devoid of roughnesses, of projections, of recesses, etc.

The annular ring 50 produced in flexible synthetic material allows a filtration of the vibrations which can be emitted by the suspension spring 12. Of course, it will be readily appreciated that the vibration filtration or damping efficiency depends in particular on the thickness of the ring 50 forming an annular bearing shoe for the spring 12. By way of illustration, the thickness of the ring 50 may, for example, be between 2 and 5 mm.

The flexible material 32 of the support cap 20 therefore makes it possible both to filter the vibrations emitted by the suspension spring 12 by virtue of the ring 50, and to seal the rolling bearing 22 via the seals 46, 48.

The internal 46 and external 48 seals perform a static sealing function with the support cap 20 and a dynamic sealing function with the bearing cap 18. In the embodiment illustrated, the internal sealing lip 56 cooperates with the skirt 18*c* of the bearing cap 18. In a variant, it might be conceivable to provide a cooperation with the upper ring 24 of the rolling bearing 22, for example at the toroidal portion 24*b*.

The downward curvature of the internal 56 and external 62 sealing lips is particularly advantageous insofar as it increases their ability to repel any splashes of water or pollutant particles. The lips 56, 62 therefore form particularly efficient deflectors. Furthermore, during such splashes, the contact pressure between the lips and the bearing cap 18 increases, thereby further increasing the efficiency of the lips.

The internal 56 and external 62 sealing lips radially delimit between the bearing cap 18 and the support cap 20 a sealed space 64 containing the lower ring 26, the upper ring 24, the cage 30 and the rolling elements 28, the space being delimited axially by the bearing cap 18 and by the support cap 20, and more particularly by the body 32 and the claws 54, 60 of the flexible material 36 of the support cap. The sealed space 64, which is sealed by the annular regions of contact of the sealing lips 56, 62 with the bearing cap 18 and the support cap 20, avoids leaks of lubricant towards the outside of the rolling bearing 22 and also the ingress of pollutant particles. Inside the sealed space 64, the rings 24, 26 of the rolling bearing are therefore protected from chemical attack (corrosion) or mechanical attack (abrasion) from the environment external to the rolling bearing 22. The lubricant present in the space 64 makes it possible to provide them with sufficient protection in the absence of surface treatments. This configuration is therefore particularly advantageous from the economic point of view, since it makes it possible to avoid carrying out costly surface treatments on the rings 24, 26.

Moreover, the sealing lip 62 also has a function of axially retaining the bearing cap 18 prior to the mounting of the device 10 between the body shell of the vehicle and the suspension spring 12. Specifically, the sealing lip 62 has an outside diameter greater than that of the hook 18e of the bearing cap 18 and is arranged axially above the latter so as to be able to interfere diametrically with the hook should the support cap 20 and the bearing cap 18 start to separate. The sealing lip 62 therefore also forms a means for axially retaining the bearing cap 18 relative to the support cap 20 in order to avoid a detachment of the elements constituting the device 10 prior to its mounting in the strut of the vehicle. The downward orientation of the sealing lip 62 facilitates its deformation during the mounting of the parts while ensuring sufficient axial retention for the handling and transport of the assembly thus constituted without risk of accidental disassembly.

The embodiment illustrated in FIG. 3, in which identical elements bear the same references, differs only in that radial channels 70 are provided, during the overmoulding of the body 32 of the support cap 20, so as to connect the internal channels 42 to the external channels 44. Each radial channel 70 is a through-channel or open while being oriented axially downwards and arranged axially below the radial portion 34b of the reinforcing insert 34.

By virtue of the existence of the channels 42 and 44 passing axially through the reinforcing insert 34 and interconnected by the radial channels 70, the flexible material 36 can be overmoulded with a reduced number of injection points, the molten flexible material then being distributed in the manufacturing mould in order to form the seals 46, 48.

After overmoulding, the studs 52, 58 situated in the same radial plane are interconnected by a radial connection bead 72 formed by one of the channels 70. Each bead 72 comes axially, on the one hand, into direct contact against the radial portion 34b of the reinforcing insert 34 and is connected, on the other hand, to the upper surface of the annular ring 50. The reinforcing insert 34 is entirely embedded inside the body 32 and the flexible material 36.

By virtue of the invention, it is possible to produce in a particularly economic manner a lower support cap capable of filtering or damping the vibrations emitted by the suspension spring, and making it possible, in cooperation with the upper bearing cap, to obtain a sealed region inside which there is arranged at least in part the rolling bearing so as to avoid having recourse to relatively expensive surface treatments of which the implementation is polluting. The life of the suspension thrust bearing device is thus extended and the risk of noisy operation which could be due to internal corrosion of the rolling bearing is reduced.

In the two embodiments described above, the lower support cap comprises a body inside which a reinforcing insert is embedded. It will be readily appreciated that it is also possible, without departing from the scope of the present invention, to replace the body and the reinforcing insert with a single part onto which the flexible material is overmoulded so as to form the annular bearing ring for the suspension spring and the internal and external sealing lips.

The invention claimed is:

1. A suspension thrust bearing device for a motor vehicle comprising:
   a rolling bearing forming an axial thrust bearing and provided with an upper ring, a lower ring and at least one row of rolling elements arranged between the rings, a bearing cap in contact with the upper ring, and
   a support cap in contact with the lower ring and forming a bearing means for a suspension spring, wherein
   the support cap comprises a body of rigid material and seals of flexible material fixed to the body and comprising dynamic sealing lips in frictional contact with at least one of the bearing cap and one of the rings of the rolling bearing and delimiting radially a sealed space containing at least the rolling elements of the rolling bearing, and wherein
   the support cap further comprising an annular ring being continuous in the circumferential direction and to which the lower ends of the seals are connected and forming a bearing surface for the suspension spring,
   the support cap further comprising a reinforcing insert comprising an axial portion and a radial portion, the reinforcing insert being at least partly embedded within the body of rigid material such that the radial portion does not directly contact the annular ring.

2. The device according to claim 1, wherein the seals each comprise a plurality of studs extending axially from the annular ring and connected to the associated sealing lip.

3. The device according to claim 1, wherein the annular ring covers at least a lower radial surface of the support cap that is axially opposed to an upper bearing surface of the support cap against which the lower ring of the rolling bearing comes into contact.

4. The device according to claim 1, wherein the sealing lips and the annular ring are produced integrally.

5. The device according to claim 1, wherein the annular ring is produced in a flexible material.

6. The device according to claim 5, wherein the flexible material is overmoulded onto the rigid material.

7. The device according to claim 5, wherein at least part of the body of rigid material is situated radially between the flexible material and the reinforcing insert, and at least a second part of the body of rigid material is situated axially between the annular ring and the radial portion of the reinforcing insert.

8. The device according to claim 5, wherein the reinforcing insert comprises means capable of allowing the passage of the flexible material through the reinforcing insert during the overmoulding of the flexible material.

9. The device according to claim 1, wherein the body of rigid material comprises a first cylindrical axial surface, a radial surface, a frustoconical surface, and a second cylindrical axial surface, a portion of the first cylindrical axial surface overlaps the axial portion of the reinforcing insert and contacts the annular ring, a portion of the radial surface abuts the annular ring, the frustoconical surface extends from the radial surface and extends to the second cylindrical axial surface, the frustoconical surface abutting the annular ring.

10. The device according to claim 1, wherein the support cap comprises an external sealing lip in frictional contact with the bearing cap.

11. The device according to claim 10, wherein the bearing cap comprises a hook extending radially inwards and cooperating with the external sealing lip for axially retaining the bearing cap relative to the support cap.

12. The device according to claim 10, wherein the support cap comprises an internal sealing lip in frictional contact with the bearing cap or the upper ring of the rolling bearing.

13. The device according to claim 1, wherein the seals of flexible material extend through a plurality of first and second channels provided in the body of the rigid material, a plurality of radial channels further provided in the body of the rigid material such that each one of the plurality of radial channels extends from one of the plurality of first channels to a corresponding one of the plurality of second channels, and wherein each of the plurality of radial channels are located axially between the annular ring and the radial portion of the reinforcing insert.

14. A strut comprising a shock absorber and a suspension thrust bearing device, the bearing device comprising, a rolling bearing forming an axial thrust bearing and provided with an upper ring, a lower ring and at least one row of rolling elements arranged between the rings, a bearing cap in contact with the upper ring, and a support cap in contact with the lower ring and forming a bearing means for a suspension spring, wherein the support cap comprises a body of rigid material and seals of flexible material fixed to the body and comprising dynamic sealing lips in frictional contact with at least one of the bearing cap and one of the rings of the rolling bearing and delimiting radially a sealed space containing at least the rolling elements of the rolling bearing, and wherein the support cap further comprising an annular ring being continuous in the circumferential direction and to which the lower ends of the seals are connected and forming a bearing surface for the suspension spring, the support cap further comprising a reinforcing insert comprising an axial portion and a radial portion, the reinforcing insert being at least partly embedded within the body of rigid material such that the radial portion does not directly contact the annular ring.

* * * * *